United States Patent
Jung et al.

(10) Patent No.: US 8,351,344 B2
(45) Date of Patent: Jan. 8, 2013

(54) SYSTEM AND METHOD FOR MEASUREMENT OF VOIP QOE AND COMPENSATION METHOD

(75) Inventors: Ilgu Jung, Daejeon (KR); Eunjin Ko, Daejeon (KR); Hyun Chul Kang, Daejeon (KR); Ho Young Song, Daejeon (KR)

(73) Assignees: Electronics and Telecommunications Research Institute, Daejeon (KR); KT Corporation, Kyeonggi-do (KR)

(*) Notice: Subject to any disclaimer, the term of this patent is extended or adjusted under 35 U.S.C. 154(b) by 128 days.

(21) Appl. No.: 12/540,747

(22) Filed: Aug. 13, 2009

(65) Prior Publication Data
US 2010/0135171 A1 Jun. 3, 2010

(30) Foreign Application Priority Data

Dec. 2, 2008 (KR) .................. 10-2008-0121423
Apr. 2, 2009 (KR) .................. 10-2009-0028568

(51) Int. Cl.
*G01R 31/08* (2006.01)
(52) U.S. Cl. ........................................ 370/252
(58) Field of Classification Search ........... 370/252–253
See application file for complete search history.

(56) References Cited

U.S. PATENT DOCUMENTS

| | | | |
|---|---|---|---|
| 2006/0073786 A1* | 4/2006 | Sarkar | 455/24 |
| 2008/0112549 A1 | 5/2008 | Yoon et al. | |
| 2008/0249843 A1* | 10/2008 | Gross | 705/10 |
| 2009/0034426 A1* | 2/2009 | Luft et al. | 370/252 |
| 2010/0232314 A1* | 9/2010 | El-Hennawey et al. | 370/252 |

FOREIGN PATENT DOCUMENTS

| | | |
|---|---|---|
| EP | 1678888 A1 | 7/2006 |
| JP | 2003-249945 A | 9/2003 |
| KR | 1020060020792 A | 3/2006 |
| KR | 1020070060513 A | 6/2007 |
| KR | 1020080044069 A | 5/2008 |
| KR | 10-0837262 B1 | 6/2008 |
| KR | 10-0847138 A | 7/2008 |
| WO | 2005/022852 A1 | 3/2005 |

* cited by examiner

*Primary Examiner* — Kwang B Yao
*Assistant Examiner* — Tung Q Tran
(74) *Attorney, Agent, or Firm* — Ladas & Parry LLP

(57) ABSTRACT

Provided are a system and a method for measurement voice over Internet protocol (VoIP) quality of experience (QoE), and a compensation method, a method for measuring QoE for a VoIP telephone service in real time, and claiming after-treatment on the basis of the measurement quality. The present invention measures subjective or objective quality for an actually generated call, and allows the subjective or objective quality to be linked with after-treatment such as compensation.

3 Claims, 7 Drawing Sheets

FIG. 6

| 0 1 2 | 3 | | 8 | | 16 | | 31 |
|---|---|---|---|---|---|---|---|
| V=2 | P | RC(5) | | RT(SR=200) | | Length | |
| SSRC of Sender |||||||||
| NTP Timestamp, Most Significant Word |||||||||
| NTP Timestamp, Least Significant Word |||||||||
| RTP Timestamp |||||||||
| Sender's Packet Count |||||||||
| Sender's Octet Count |||||||||
| SSRC_1 (SSRC of First Source) |||||||||
| Fraction Lost | | | Cumulative Number of Packets Lost |||||||
| Extended Highest Sequence Number Received |||||||||
| Interarrival Jitter |||||||||
| Last SR (LSR) |||||||||
| Delay Since Last SR (DLSR) |||||||||
| SSRC_2 ............ |||||||||
| Profile-specific Extensions |||||||||
| Padding Octets | | | | | | Number of Padding |

SYSTEM AND METHOD FOR MEASUREMENT OF VOIP QOE AND COMPENSATION METHOD

CROSS-REFERENCE TO RELATED APPLICATION

This application claims priority to and the benefit of Korean Patent Application Nos. 10-2008-0121423 and 10-2009-0028568 filed in the Korean Intellectual Property Office on Dec. 2, 2008 and Apr. 2, 2009, the entire contents of which are incorporated herein by reference.

BACKGROUND OF THE INVENTION (a) Field of the Invention

The present invention relates to a system and a method for measurement of voice over Internet protocol (VoIP) quality of experience (QoE) and a compensation method, and more particularly, to a method of measuring VoIP QoE in real time and performing after-treatment such as compensation for low quality on the basis of the measurement quality.

(b) Description of the Related Art

In general, a method of measuring the quality of a VoIP service attaches the greatest importance to objectivity, and primarily adopts an objective measurement method of performing evaluation with a result measured by using a measuring instrument or an agent-type measuring module.

Further, the quality measurement method also adopts a method of measuring the quality of the VoIP service on the basis of only a test measurement method irrespective of an actual call. For example, the quality measurement method that measures call quality in a predetermined website adopts a method of measuring a packet loss ratio or delay by sending a test packet to a predetermined server and determining the quality by using the measured value. Therefore, various phenomena generated in the actual call cannot be reflected.

An objective method of measuring voice quality of the VoIP service can largely be classified into three types.

The first type is a perceptual evaluation speech quality (PESQ) algorithm. The PESQ algorithm is a method of measuring the quality by using an audio sample for measuring standard voice quality. This method cannot directly measure the voice quality with respect to an actually generated call, but it can accurately measure the quality with respect to a predetermined interval. Further, multiple repetitive quality measurements that can be compared with each other can be performed.

However, most equipment adopting the algorithm is very expensive. When a failure occurs in a voice call service or a voice call service network is constructed, the equipment is used to only measure voice quality in the network.

The second type is a single-ended method for objective speed quality assessment (SMFOSQA) algorithm. This algorithm can directly measure the quality of the actually generated call without using an audio sample for measuring the standard voice quality. On the contrary, since the algorithm does not measure the voice quality by using the audio sample for measuring the standard voice quality, the algorithm has a very large measurement value error.

Further, hardware performance of a very large capacity is required to use the algorithm. However, since the algorithm can directly measure the voice quality of the actually generated call, the algorithm can more flexibly deal with substantial voice subscriber quality measurement of a substantial voice subscriber.

The third type is an E-Model method. This method is used to calculate an R-factor value and only measures the value with respect to the VoIP service. The reason for this is that it is assumed that the E-Model is available with respect to only the VoIP service which is performed on an IP network. This method can be implemented in a relatively simple manner. Since this method is still less expensive than the PESQ method or the SMFOSQA, most VoIP providers measure and manage the quality by using this method.

However, since the quality is measured and managed by the test measurement method regardless of the actual call, various phenomena generated in the actual call cannot be reflected. Further, although this method is used to measure the quality of the actual call, most parameters must be set as basic values.

In addition, since the performance of a VoIP terminal has already reached a very high level, the values of the parameters need not be measured. The reason for this is that it is assumed that the voice quality is most damaged when a packet is lost or delayed on a network. However, in reality, the performance of the VoIP terminal has a large influence on an actual VoIP call service user.

Recently, even though a problem of a terminal or an environment around the terminal that deteriorates QoE cannot be managed by the VoIP providers, the VoIP providers also want to measure the quality and manage subscribers by considering environments of the subscribers due to various reasons such as competition of VoIP providers. The requirement can be achieved only by a subjective part of the VoIP service user, and cannot be solved by the known objective measurement methods.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a system and a method for measurement of VoIP QoE and a compensation method having advantages of managing quality by measuring customer QoE for a VoIP telephone service in real time by an objective measurement method and a subjective measurement method, and performing follow-up management on the basis of the quality management.

An exemplary embodiment of the present invention provides a system for measurement of VoIP QoE that includes: a QoE analysis unit that receives and analyzes first quality measurement information collected through a predetermined measurement method and second quality measurement information collected through a terminal with respect to voice quality; a subscriber management unit that performs subscriber management for after-treatment on the basis of analysis in the QoE analysis unit; and an opening/cancelling management unit that collects data to be used for analysis of the second quality measurement information in the QoE analysis unit.

Another embodiment of the present invention provides a method for measurement of VoIP QoE that includes: checking a packet inputted through a session for measuring voice quality when a voice quality measurement request signal is inputted; measuring a one-way delay value for the corresponding packet when the inputted packet is a first packet; calculating an R-value on the basis of the measured delay value; and judging whether or not a quality evaluation value is inputted and providing measured QoE information on the basis of the R-value and the quality evaluation value when an SMS value is inputted.

Yet another embodiment of the present invention provides a compensation method using VoIP QoE that includes receiving a measurement result value including a first measurement value and a quality evaluation value that are QoE measurement results from a terminal; checking the number of compensation claims of the terminal and determining a quality section on the basis of the quality evaluation value; and generating follow-up action particulars depending on the determined quality section.

BRIEF DESCRIPTION OF THE DRAWINGS

FIG. 6 is an exemplary diagram illustrating a header structure of an RTCP of a VoIP stream packet according to an exemplary embodiment of the present invention.

DETAILED DESCRIPTION OF THE EMBODIMENTS

Figure 1:
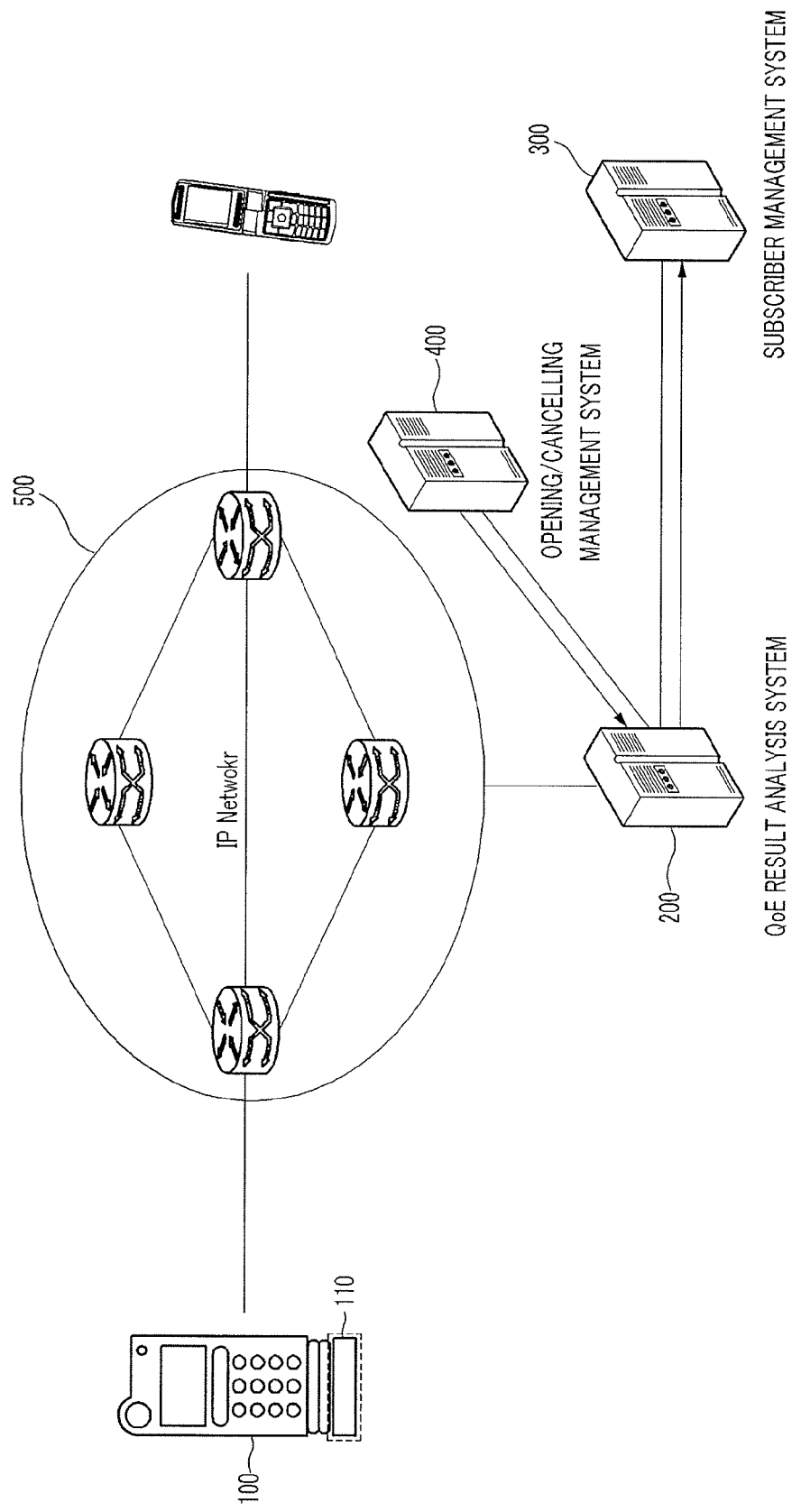
FIG. 1 is a system configuration diagram according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, unless explicitly described to the contrary, the word "comprise" and variations such as "comprises" or "comprising" will be understood to imply the inclusion of stated elements but not the exclusion of any other elements.

In the specification, a terminal may designate a mobile station (MS), a mobile terminal (MT), a subscriber station (SS), a portable subscriber station (PSS), user equipment (UE), an access terminal (AT), etc., and may include the entire or partial functions of the terminal, the mobile terminal, the subscriber station, the portable subscriber station, the user equipment, the access terminal, etc.

A method of measuring real-time QoE of a VoIP through quality evaluation considering a user's directive and subjective quality evaluation and a compensation method according to an exemplary embodiment of the present invention will be described with reference to the accompanying drawings.

FIG. 1 is a system configuration diagram according to an exemplary embodiment of the present invention.

As shown in FIG. 1, in order to measure and manage quality of experience (hereinafter, referred to as "QoE") of a real-time VoIP service, a soft phone type of terminal 100 mounted with a module of measuring the QoE of a VoIP service user and a QoE result analysis unit 200 that receives, analyzes, and manages a measurement result of the QoE are provided. A caller's terminal 100 and a receiver's terminal 100 are connected to each other through an IP network 500.

With this, the system includes a service opening/cancelling management unit 400 that collects fundamental data to be used for analysis of the measurement result of the QoE in the QoE result analysis unit 200. Further, it is determined whether or not the quality is violated on the basis of a stipulation agreed to at the time of subscribing to the service with respect to the measurement result of the QoE, and when the quality is violated, compensation corresponding to the violation is claimed, or interworking with a subscriber management unit 300 that manages the subscribers in a different manner is also required.

The VoIP QoE measurement and the compensation will now be described with reference to FIG. 1 in brief. A caller and a receiver start a call by using an already registered VoIP service. When the caller thinks that the quality of voice sent from the receiver is not good during the call, the caller clicks on a QoE measurement and compensation claim button 110 provided in the terminal 100.

In the exemplary embodiment of the present invention, although the QoE measurement and compensation claim button is an additional button mounted with a module of measuring subjective QoE and is mounted on the terminal 100, any button selected from several buttons that have already been provided in the terminal 100 may perform the corresponding function. In addition, the QoE measurement and compensation claim button 110 interworks with the QoE measurement module.

When the QoE measurement and compensation claim button 110 is clicked, the QoE measurement module mounted in the terminal 100 is driven and a first message for indicating that the QoE for presently calling voice quality is being measured is displayed on a screen of the terminal 100 of the caller who is calling. At this time, the QoE measurement module that is incorporated in the terminal 100 measures a packet delay value and a packet loss ratio value among parameters used in an E-Model method among quality measurement methods while the caller and the receiver are talking to each other. Measurement of the packet delay value and the packet loss ratio value will be described below.

When the call between the caller and the receiver is terminated, a second message for inducing subjective quality measurement is displayed on the terminal 100 of the caller who applies for QoE measurement and compensation claim, and the corresponding message may be transmitted by voice. The caller receives a quality opinion by using numeric buttons of the terminal 100 for the caller's own subjective quality evaluation depending on the message. When the quality opinion for a user is received, a third message for indicating that the opinion is received is displayed on the caller's terminal 100, and the corresponding message may be transmitted by voice.

The received user's quality opinion (or also referred to as "subjective measurement result") is transmitted to the QoE result analysis unit 200 together with an objective measurement result measured during the call. The QoE result analysis unit 200 analyzes the received objective measurement result and the subjective measurement result, and claims the compensation in accordance with the analysis result or transmits the corresponding data to the subscriber management unit 300 with respect to a subscriber who is a predetermined management target. Herein, a method of analyzing the objective measurement result and the subjective measurement result will be described with reference to FIGS. 2 to 5.

First, a policy of an internal function module that performs quality violation judgment and evaluation while the QoE result analysis unit 200 analyzes the objective measurement result and the subjective measurement result will be described with reference to FIG. 2.

Figure 2:
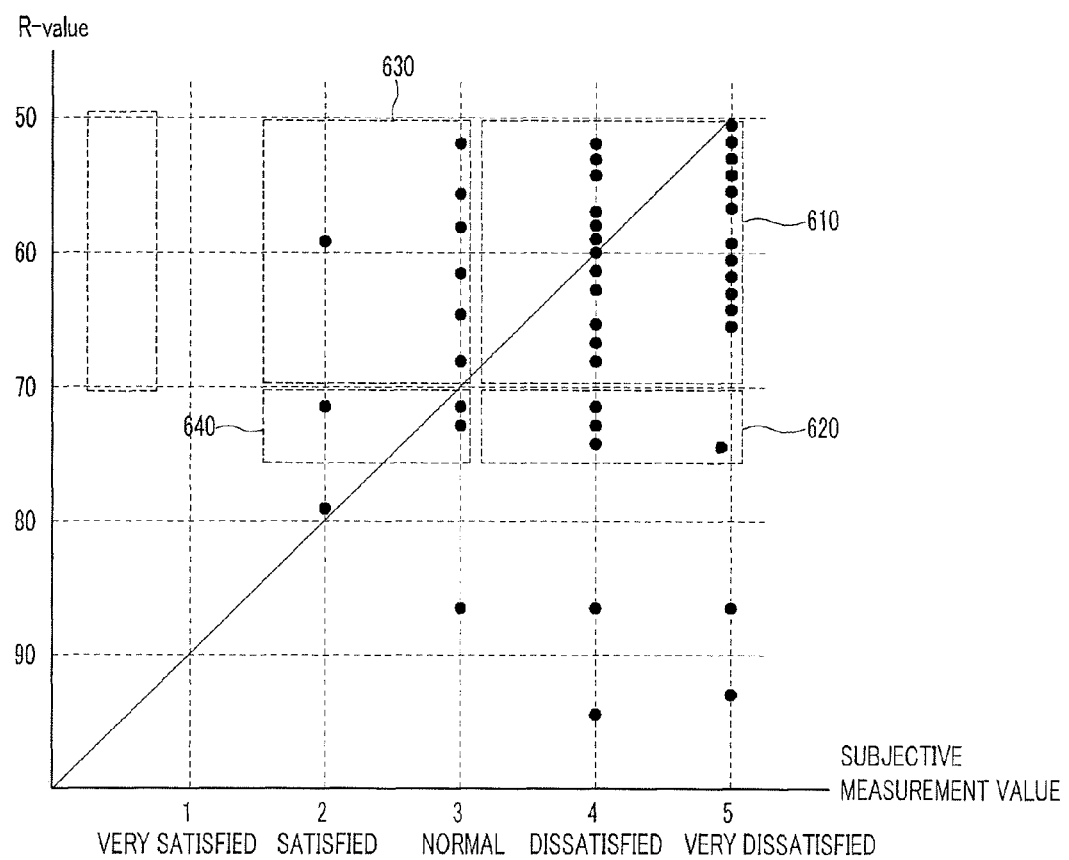
FIG. 2 is an exemplary diagram illustrating a policy of an internal function module that performs quality violation judgment and quality evaluation in a QoE result analysis unit according to an exemplary embodiment of the present invention.

FIG. 2 is an exemplary diagram illustrating a policy of an internal function module that performs quality violation judgment and quality evaluation in a QoE result analysis unit according to an exemplary embodiment of the present invention.

A policy determination reference graph shown in FIG. 2 is generated based on data of a part where the service opening/cancelling management unit 400 shown in FIG. 1 inquires of the subscriber about cancellation and manages the cancellation at the time when the subscriber requests the cancellation and a past QoE measurement history of subscribers that have canceled the service due to quality dissatisfaction, which is previously stored in the QoE result analysis unit 200.

A vertical axis (Y axis) of the graph represents an objective measurement value (hereinafter referred to as "R-value" or "first value") of the E-Model, which is an objective measurement method, and the unit is defined to the scope of the R-value. In the exemplary embodiment of the present invention, although the E-Model method is used among several methods, other methods may be used. A horizontal axis (X axis) represents an input value of a subjective measurement method, which is inputted by the subscriber.

When the QoE of the method described in FIG. 1 is measured on the basis of such a graph model, a quality value indicating point for the subscriber may be shown in the graph. A slope of a graph line formed when a value of the objective measurement method and a value of the subjective measurement method meet each other has already been shown in a table form in ITU-T G.107, etc.

When the quality is measured by selecting the QoE measurement and compensation claim button and the measurement result is shown in the graph, values inputted by most subscribers show that dissatisfaction of call quality is high. The reason for this is that the QoE measurement and compensation claim button 110 of the terminal 100 is clicked when the caller judges that actual quality is somewhat abnormal.

When quality measurement contents of many subscribers are shown in the graph and the contents are analyzed, the scope of a subjective quality measurement value indicating the level of an objective quality measurement result when the subscriber feels that the quality is bad can be known. In particular, when QoE measurement distribution before the subscribers who cancelled the service due to the quality dissatisfaction is analyzed, the levels of the objective quality measurement value and the subjective quality measurement value can be known when a possibility that the subscribers will cancel the service is high. Classification of such a scope is provided as information that allows the VoIP service providers to determine how to manage the subscribers who are dissatisfied with the call quality.

A determination table for finally making a determination relating to the compensation by using the policy of the internal function module that performs the quality violation judgment and evaluation is shown in Table 1.

TABLE 1

| Classification | R-value | SMS | Number of times of QoE measurement and compensation claim |
|---|---|---|---|
| First section | 50 ≦ R < 70 | 4-5 | X |
| Second section | 70 ≦ R < 75 | 4-5 | 3 |
| Third section | 50 ≦ R < 70 | 2-3 | 4 |
| Fourth section | 70 ≦ R < 75 | 2-3 | 8 |
| Fifth section | 50 ≦ R < 70 | X | X |

Table 1 is used in the QoE result analysis unit 200. Sections are classified in accordance with scopes of the R-value which is the objective quality measurement value and the subjective quality measurement score (SMS), and information is provided to each classification so that the VoIP service provider can manage the subscribers for each QoE quality level by combining the number of times of QoE measurement and compensation claim. In the exemplary embodiment of the present invention, although only parameters such as the R-value, SMS, and the number of times of QoE measurement and compensation claim are used in order to classify the section, other parameters may be used.

Herein, the classifications shown in Table 1 and the graph of FIG. 2 will be described. First, in a first section 610, quality values of the subscribers are shown, such as the R-value being equal to or more than 50 and less than 70 and, a subjective quality measurement value of 4 or 5. Subscribers who record the quality in the first section 610 among subscribers who have not yet cancelled the service and are dissatisfied with the quality are persons who have a high possibility of cancelling the service. When a measurement result of the subscriber who executes the QoE measurement and compensation claim is positioned in the first section 610, the VoIP service provider must perform a follow-up action for enhancing the quality in addition to immediate compensation.

Next, in a second section 620, quality values of the subscribers in which the R-value is equal to or more than 70 or equal to or less than 75 and the subjective quality measurement value is 4 or 5 are shown. Even though the objective quality measurement value is a normal level that is equal to or more than 70, the subscribers indicating the quality value in the second section 620 feel that the subjective quality is dissatisfactory or very dissatisfactory and inferior to normal. The subscribers can be regarded as subscribers who are more sensitive to the call quality than general subscribers.

When these types of subscribers frequently click on the QoE measurement and compensation claim button 110 described in FIG. 1, that is, the subjective quality measurement feel is continuously equal to or less than normal after performing the quality measurement several times, the subscriber has a comparatively high possibility of cancelling the service in the future. Therefore, subscribers that indicate the quality value in the second section 620 require quality measurement of a predetermined number of times even though the objective quality measurement value is in a normal level, and the VoIP service provider needs to perform proper follow-up management for the subscribers.

Next, in a third section 630, quality values of subscribers in which the R-value is less than 70 and the subjective quality is normal or satisfactory are shown. The subscribers of this section can be regarded as subscribers who are less sensitive to the call quality than the general subscribers.

However, in the third section 630, when the subscriber who indicates the quality values continuously clicks on the QoE measurement and compensation claim button, the subscriber recognizes that the quality is worse than the subscriber feels by requiring the quality measurement of a predetermined number of times or more. Therefore, when the subscribers who indicate the quality values in the third section 630 also require quality measurement of a predetermined number of times similar to the subscribers in the second section 620, the VoIP service provider needs to perform proper follow-up management for the subscribers.

In a fourth section 640, quality values of the subscribers in which the R-value is equal to or more than 70 or less than 75 and the subjective quality measurement value is 2 or 3 are shown. The subscribers who indicate the quality values in the fourth section 640 measure and verify the quality of services to which they subscribe by frequently clicking on the QoE measurement and compensation claim button 110 even though the objective quality measurement value and the subjective quality measurement value are equal to or more than normal.

When the subscribers who indicate the quality values in the fourth section 640 feel that the quality is bad, the VoIP service provider must regard the subscribers as persons who have a high possibility of cancelling the service with many complaints. Therefore, when the subscribers who indicate the quality value in the fourth section 640 also require quality measurement of a predetermined number of times similar to the subscribers in the second section 620 and the third section 630, the VoIP service provider needs to perform the proper follow-up management for the subscribers.

In the analysis, the policy can be prepared in a month unit or a quarter unit by considering characteristics and policies of the VoIP service providers. For example, in a compensation method for telephone call quality, most VoIP service providers measure communication quality of a corresponding section by generating test calls with a telephone call quality measurement website.

The R-value of the E-Model which is the objective measurement method is calculated by using the measured communication quality value and after-treatment relating to the compensation is performed depending on the value. Even in the compensation-related after-treatment using the known objective measurement method, the compensation-related after-treatment is performed only when the R-value is equal to or less than 70 which is the top limit for a target of the compensation-related after-treatment on advice from a standard organization, etc.

Subsequently, a method of measuring actual QoE by using the module that measures the QoE, which is mounted in the terminal 100, will be described with reference to FIGS. 3A and 3B.

Figure 3A:
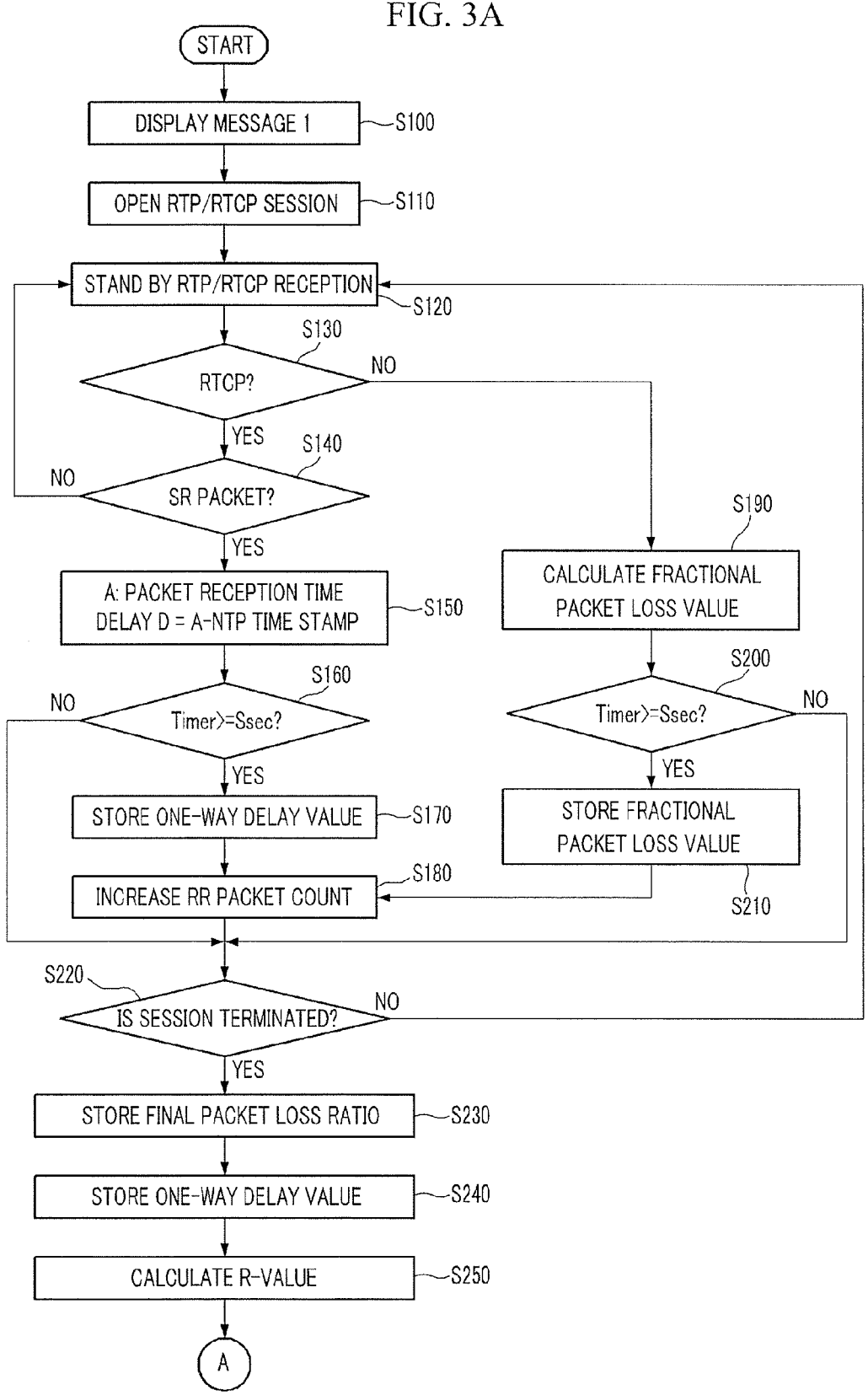
FIGS. 3A and 3B are flowcharts illustrating a method of measuring QoE according to an exemplary embodiment of the present invention.
Figure 3B:
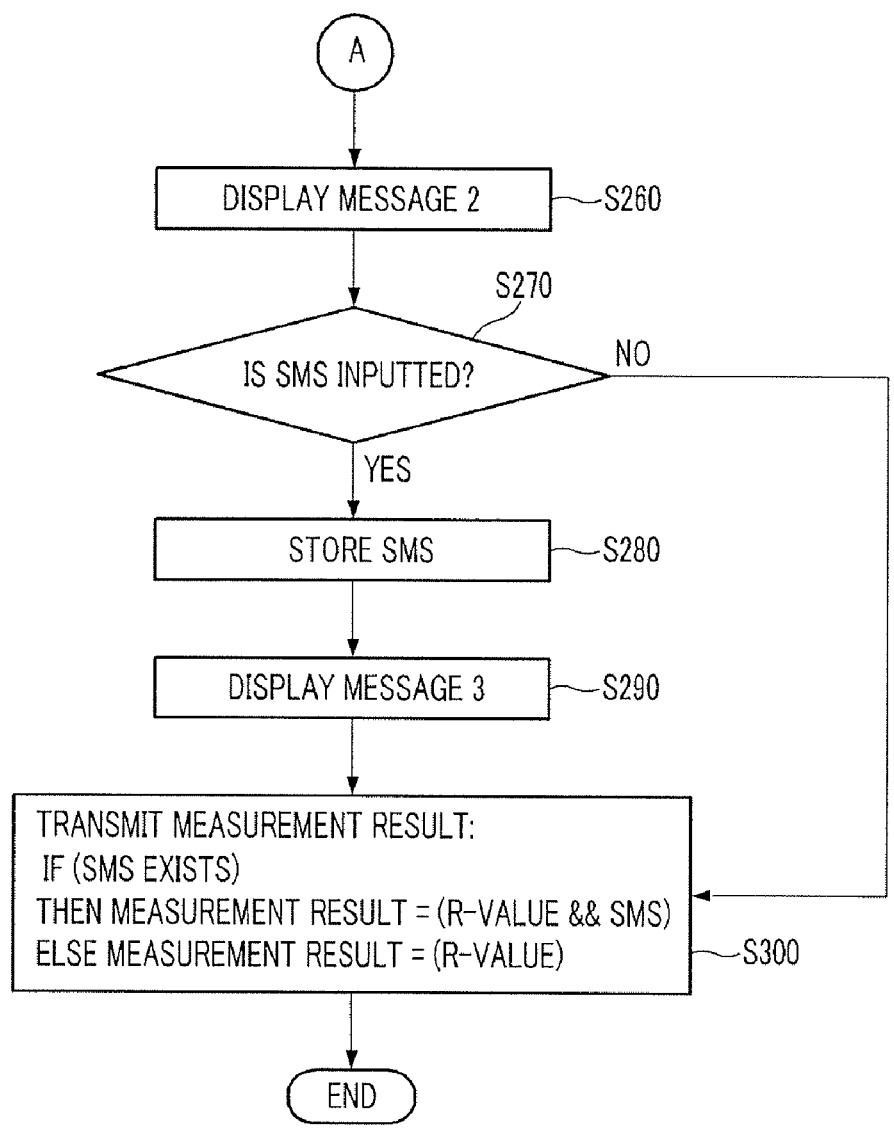

FIGS. 3A and 3B are flowcharts illustrating a method of measuring QoE according to an exemplary embodiment of the present invention.

As shown in FIGS. 3A and 3B, when a service user judges that call quality is bad while using a service and clicks on a QoE measurement and compensation claim button 110, a module is actuated. When the module is actuated, a first message is displayed on a terminal 100 (S100). After the first message is displayed, the module opens a real-time transport protocol/real-time transport control protocol (RTP/RTCP) session (S110).

After the module opens the session, the module stands by reception of a packet (S120). Then, when any one of an RTP packet (also referred to as "second packet") or an RTCP packet (also referred to as "first packet") is received, the module judges whether or not the received packet is the RTCP packet (S130).

If the module judges that the received packet is not the RTCP packet, the module calculates a fractional packet loss value (S190). A measurement cycle in calculation is basically 5 seconds, which is a transmission cycle of the RTCP packet, but the measurement cycle is not limited thereto. In other words, the module judges whether or not a predetermined time is equal to or more than 5 seconds (S200), and when the predetermined time is more than 5 seconds, the module stores the measurement value (S210).

After the fractional packet loss value is accumulated and stored, the number of times of receiving a receiver report (RR) packet is increased one by one in order to calculate a final loss value when the session is terminated. A method of calculating the fractional packet loss value has already been known, and in the exemplary embodiment of the present invention, a detailed description thereof will be omitted.

On the contrary, if the received packet is the RTCP packet, the module judges whether or not the received RTCP packet is a sender report (SR) packet (S140). The SR packet will be described below. If the RTCP packet is the SR packet, a delay time is calculated by using a time stamp of the packet (S150). That is, assuming that a time when a reception side receives the SR packet is represented by A and a one-way delay is represented by D, the delay time is calculated as shown in Equation 1.

$$D = A - (NTP \text{ time stamp of } SR) \qquad [\text{Equation 1}]$$

In other words, a value acquired by subtracting the NTP time stamp of the SR packet from the time when the reception side receives the SR packet is a one-way transmission delay time.

Next, whether or not the measurement cycle is more than the predetermined measurement cycle is judged (S160). If the measurement cycle is more than the predetermined measurement cycle, a measurement result value is stored by acquiring an average one-way delay value when the session is terminated by measuring the transmission delay for all received RTCP packets (SR) (S170). The measurement cycle is basically 5 seconds, which is the transmission cycle of the RTCP (RR) packet, but the measurement cycle is not limited thereto.

Next, in step S110, whether or not the opened session is terminated is judged (S220). At this time, when the session is terminated, a final packet loss ratio is calculated and stored (S230) and the one-way delay value is calculated and stored (S240). An R-value which is a result value of an objective measurement method is calculated and stored by using the final packet loss ratio and the average one-way delay value (S250). In addition, a second message is transmitted by voice while being displayed on a screen for the subscriber's subjective quality evaluation (S260).

Whether or not a subjective quality evaluation value is inputted during a predetermined time is judged (S270). At this time, if the subjective quality evaluation value is inputted, the subjective quality evaluation value is stored (S280). In addition, a third message indicating that QoE measurement and a compensation claim is applied is displayed or transmitted by voice (S290). Further, after the measurement result is transmitted to a QoE result analysis unit 200 (S300), the operation of the module is terminated.

Next, an operation procedure of the QoE result analysis unit of FIG. 1 will be described with reference to FIG. 4.

Figure 4:
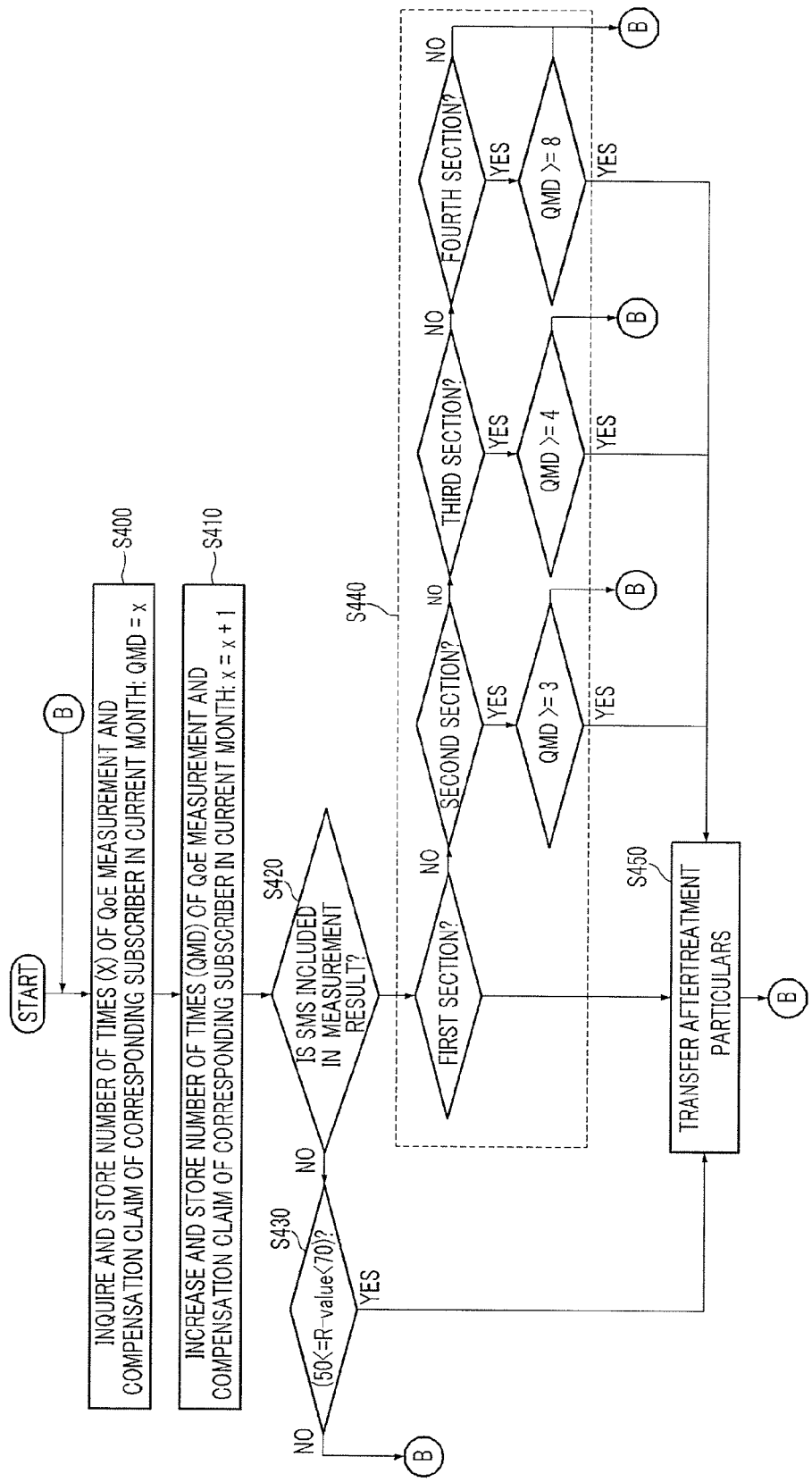
FIG. 4 is an operational flowchart of a result analysis system according to an exemplary embodiment of the present invention.

FIG. 4 is an operational flowchart of a result analysis system according to an exemplary embodiment of the present invention.

As shown in FIG. 4, when the measurement result (R-value and SMS) values measured by the terminal 100 described in FIG. 1 or FIGS. 3A and 3B are inputted, the number of times of QoE measurement and compensation claim of the subscriber is inquired (S400). The inquired value is stored in a local variable and the number of times of QoE measurement and compensation claim is increased by one and stored again (S410).

In addition, it is judged whether or not the SMS value is included in the inputted measurement result (S420). At this time, if the SMS value is included in the inputted measurement result, a section is determined in accordance with a determination table described in FIG. 1 (S440). Follow-up action particulars are transmitted to a subscriber management unit 300 in accordance with the determined particulars (S450), and a standby state is returned so as to process a follow-up measurement result.

On the contrary, in step S420, when the SMS is not included in the measurement result, the R-value is determined to be a predetermined value and a section is determined in accordance with the R-value (S430).

Next, header structures of an RTP and an RTCP among VoIP stream packets will be described with reference to FIGS. 5 and 6.

Figure 5:
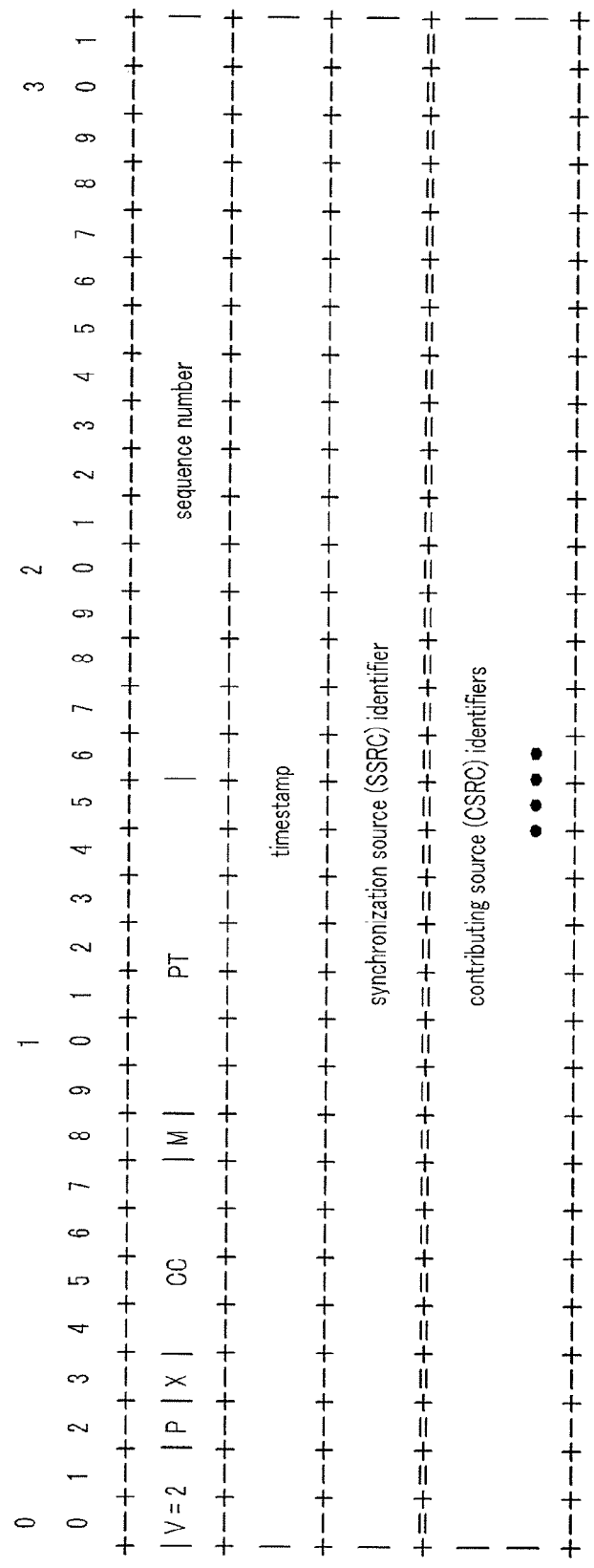
FIG. 5 is an exemplary diagram illustrating a header structure of an RTP of a VoIP stream packet according to an exemplary embodiment of the present invention.

FIG. 5 is an exemplary diagram illustrating a header structure of an RTP of a VoIP stream packet according to an exemplary embodiment of the present invention, and FIG. 6 is an exemplary diagram illustrating a header structure of an RTCP of a VoIP stream packet according to an exemplary embodiment of the present invention.

First, as shown in FIG. 5, the higher 12 bytes of all RTP packets are fixed, and thereafter a CSRC field is added by a mixer. However, the mixer is not inserted in a point-to-point structure.

Among various items of a header of the RTP packet, items used to measure the quality of the packet are a sequence number and a time stamp. The sequence number is increased by 1 whenever the RTP packet is transmitted from a transmitter to a receiver. The time stamp field represents a moment when a first octet of the RTP packet is sampled. A sampling time is generated from a constantly increased clock, and is used for synchronization of real-time data and calculation of inter-arrival jitter in the reception side.

Next, as shown in FIG. 6, the RTPC transfers feedback information on RTP data flow to the terminal. General contents of the feedback information include statistical data on an amount of data transmitted thus far and a loss ratio thereof. Further, the general contents include jitter and round trip time (RTT) values.

The RTCP packets can be largely classified into five types, which are shown in Table 2.

TABLE 2

| Packet type | Packet name | Function |
| --- | --- | --- |
| 200 | Sender Report (SR) | Sender report |
| 201 | Receiver Report (RR) | Receiver report |
| 202 | Source Descriptions (SEDS) | Description of source |
| 203 | Bye (BYE) | Inform termination of participation |
| 204 | Application Specific (APP) | Used for application function |

The type of the RTCP packet used for measuring the quality of the RTP packet among the packet types shown in Table 2 is an SR packet. The header structure of the SR packet protocol of the RTCP is shown in FIG. 6. Items used for analysis of packet quality include items such as an NTP time stamp of a sender information block, an RTP time stamp, and a sender packet count. Thereafter, values of fraction loss of a report block, a cumulative number of lost packets, inter-arrival jitter, last sender report (LSR), and delay since last SR (DLSR) are fields used for a reception report at the transmission side.

The NTP time stamp, which is a 64-bit field, represents a time when the report is sent and is used for calculation of RTT delay. The RTP time stamp is calculated from a corresponding NTP time stamp by using a relationship between an RTP time stamp count and actual time. A sender's packet count represents a total number of RTP data packets transmitted by the sender from a transmission start time to a time when the packet is generated.

The fractional loss field represents a ratio of an RTP data packet lost after a former SR or RR packet is transmitted. A fractional loss value of which an average value is a fractional loss value of the RR packet received during one call is acquired through the value.

A cumulative number field of the loss packet is defined by a value acquired by subtracting the number of actually received packets from the number of packets that is expected as the number of total RTP data packets lost from a source SSRC_n since reception is started. The number of delay-arrived packets and the number of repetitively arrived packets are also included in the number of actually received packets.

A received highest sequence number field is a 32-bit field. Sixteen lower bits include the highest sequence of the RTP data packets received from the source SSRC_n, and the sequence of 16 higher bits extends to a corresponding count of a sequence cycle managed in accordance with a predetermined algorithm.

The jitter field, which is a 32-bit field, represents a statistical variable measurement value between RTP data packet arrival times that are measured in a time stamp unit and expressed as an unsigned integer. Assuming that Si represents an RTP time stamp from a packet i and Ri represents an arrival time measured in an RTP time stamp unit of the packet i, a jitter D of packets i and j is expressed in Equation 2, and an inter-arrival jitter J is defined as shown in Equation 3.

$$D(i,j)=(Rj-Ri)-(Sj-Si)=(Rj-Sj)-(Ri-Si) \qquad \text{[Equation 2]}$$

$$J=J+(|D(i-1,I)|-J)/16 \qquad \text{[Equation 3]}$$

Herein, 1/16, which is a gain parameter, ensures a high noise reduction ratio while ensuring an appropriate astriction speed.

The LSR field, which is a 32-bit field, represents 32 intermediate bits of a 64-bit NTP time stamp, which is a part of an RTCP SR that is recently received from the source SSRC_n. When the LSR field has not yet received the SR, the field has a value of 0.

The DLSR field, which is the 32-bit field, represents reception of a final SR packet from the source SSRC_n and delay during transmission between reception report blocks, and is expressed in the unit of 1/65536 sec. When the DLSR field has not yet received the SR packet from the source SSRC_n, the value of the field is set to 0.

According to an embodiment of the present invention, it is possible to provide a more accurate quality measurement result for VoIP by measuring subjective and objective QoE for VoIP subscribers in real time.

Further, it is possible to provide quality-related follow-up actions for each type with respect to users on the basis of objective quality measurement information and subjective quality measurement information.

The embodiments of the present invention are implemented through only the apparatus and method, but may be implemented through a program that realizes functions corresponding to constituent members of the exemplary embodiments of the present invention or a recording medium in which the program is recorded. The implementation will be easily accomplished by those skilled in the art as described in the exemplary embodiments.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A system for measurement of Voice over Internet Protocol (VoIP) Quality of Experience (QoE), comprising:
   a QoE analysis unit that receives and analyzes first quality measurement information collected through a predetermined measurement method and second quality measurement information collected through a terminal with respect to voice quality, wherein the terminal includes a customer QoE measurement module wherein measurement of customer QoE is initiated by a request signal inputted from the outside, displays a first message indicating that the customer QoE for presently calling voice quality is being measured when the measurement of customer QoE is initiated, a second message for inducing the customer QoE measurement when the QoE analysis unit has collected the first quality measurement information, and a third message indicating that the customer QoE measurement is received when the QoE analysis unit has received the customer QoE measurement;
   a subscriber management unit that performs subscriber management for after-treatment on the basis of analysis in the QoE analysis unit; and
   an opening/cancelling management unit that collects data to be used for analysis of the second quality measurement information in the QoE analysis unit,
   wherein the first quality measurement information includes a one-way delay value for a first packet inputted through a session for measuring voice quality,
   wherein the one-way delay value is for a sender report packet, wherein the one-way delay value is an average one-way transmission delay value based on transmission delay for all received first packets when a one-way transmission delay time on the basis of a time stamp of the first packet inputted through the session for measuring voice quality exceeds a predetermined delay time.

2. The system for measurement of VoIP QoE of claim 1, wherein when the inputted packet is a second packet, the first quality measurement information includes a one-way delay value for the second packet, wherein the one-way delay value is a fractional packet loss value calculated from the second packet when a one-way transmission delay time on the basis of a time stamp of the first packet excees a predetermined delay time.

3. The system for measurement of VoIP QoE of claim 2, wherein the first packet is a real-time transport control protocol (RTCP) packet and the second packet is a real-time transport protocol (RTP) packet.

* * * * *